(12) United States Patent
Mori

(10) Patent No.: US 11,273,768 B2
(45) Date of Patent: Mar. 15, 2022

(54) ADJUSTABLE VEHICLE LUGGAGE COMPARTMENT ATTACHMENT SYSTEM

(71) Applicant: Skymor LLC., Jersey City, NJ (US)

(72) Inventor: Andres Mori, Jersey City, NJ (US)

(73) Assignee: SKYMOR LLC, Jersey City, NJ (US)

( * ) Notice: Subject to any disclaimer, the term of this patent is extended or adjusted under 35 U.S.C. 154(b) by 174 days.

(21) Appl. No.: 16/723,046

(22) Filed: Dec. 20, 2019

(65) Prior Publication Data

US 2020/0207278 A1 Jul. 2, 2020

Related U.S. Application Data

(60) Provisional application No. 62/785,833, filed on Dec. 28, 2018.

(51) Int. Cl.
| | | |
|---|---|---|
| *B60R 9/045* | (2006.01) | |
| *B60R 9/048* | (2006.01) | |
| *B60R 9/058* | (2006.01) | |
| *B60R 11/00* | (2006.01) | |

(52) U.S. Cl.
CPC ............. *B60R 9/045* (2013.01); *B60R 9/048* (2013.01); *B60R 9/058* (2013.01); *B60R 2011/004* (2013.01); *B60R 2011/0056* (2013.01); *B60R 2011/0066* (2013.01); *B60R 2011/0084* (2013.01)

(58) Field of Classification Search
CPC ... B60R 9/045; B60R 9/048; B60R 2011/004; B60R 2011/0056; B60R 2011/0084
See application file for complete search history.

(56) References Cited

U.S. PATENT DOCUMENTS

| | | | | |
|---|---|---|---|---|
| 2,247,128 A | * | 6/1941 | Levey .................. | B60P 3/1025 414/532 |
| 2,464,979 A | * | 3/1949 | Howard ................ | B60R 9/06 224/488 |
| 2,567,104 A | * | 9/1951 | Di Fonzo ............... | E04H 15/06 414/462 |
| 2,772,799 A | * | 12/1956 | Bridinger ............. | B60P 3/1016 414/462 |
| 2,834,491 A | * | 5/1958 | Wells ................... | B60P 3/1025 414/462 |
| 3,709,413 A | * | 1/1973 | Nelson ................. | B60P 3/1008 224/310 |
| 3,712,524 A | * | 1/1973 | Ames, Sr. ............. | B60P 3/1025 224/310 |
| 3,960,301 A | * | 6/1976 | Miller .................. | B60P 7/0823 224/318 |

(Continued)

*Primary Examiner* — Brian D Nash
(74) *Attorney, Agent, or Firm* — Libby Babu Varghese; Scarinci Hollenbeck

(57) ABSTRACT

An adjustable vehicle luggage compartment attachment system comprises at least one bracket having a top end and a lower end. The top end receives a luggage compartment and the lower end mounts on the vehicle at the rear window or the trunk. At the top end of the bracket, at least one horizontal beam may be used to mount the luggage compartment. At the lower end the bracket may be releasably, fastenable and removeable from the vehicle and said luggage compartment using attachment mechanism such as a suction cup or other soft releasably, removeable attachment mechanism. The bracket may be static or expandable vertically, horizontally or both.

17 Claims, 4 Drawing Sheets

(56) References Cited

U.S. PATENT DOCUMENTS

| | | | | |
|---|---|---|---|---|
| 4,046,273 A | * | 9/1977 | Hughes | B60P 3/1008 |
| | | | | 414/462 |
| 4,168,023 A | * | 9/1979 | Osborn | B60R 9/04 |
| | | | | 108/44 |
| 4,531,879 A | * | 7/1985 | Horowitz | B60R 9/08 |
| | | | | 224/310 |
| 4,630,990 A | * | 12/1986 | Whiting | B60R 9/042 |
| | | | | 224/310 |
| 4,871,103 A | * | 10/1989 | Martinsson | B60R 9/042 |
| | | | | 224/310 |
| 5,292,045 A | * | 3/1994 | Mandel | B60R 9/00 |
| | | | | 224/309 |
| 5,492,259 A | * | 2/1996 | Tippets | B60R 9/00 |
| | | | | 224/309 |
| 7,226,266 B2 | * | 6/2007 | Henderson | B60R 9/042 |
| | | | | 414/462 |
| 9,688,213 B2 | * | 6/2017 | Lisle | B60R 9/058 |
| 10,723,276 B2 | * | 7/2020 | Casagrande | B60R 9/08 |
| 10,870,453 B2 | * | 12/2020 | Elder | B60P 7/0807 |

\* cited by examiner

ADJUSTABLE VEHICLE LUGGAGE COMPARTMENT ATTACHMENT SYSTEM

FIELD OF THE INVENTION

The present invention relates generally to luggage compartment attachment for a vehicle, and more.

BACKGROUND OF THE INVENTION

Luggage compartments for installation on top of a vehicle provide a convenient storage option to increase available storage for a vehicle, such as cars with limited trunk storage space. Limitations on the available roof area for mounting a luggage compartment on top of a vehicle limits the size of available luggage compartments for a vehicle.

What is desired is an attachment system to increase the use of larger luggage compartments for smaller vehicles or vehicles without available roof mounting options.

SUMMARY OF THE INVENTION

An adjustable vehicle luggage compartment attachment system comprises a bracket having at least one support having a top end, a lower end and a support length disposed between said top end and said lower end. A first and a second releasably fastenable mechanism are disposed at each said top end and said lower end, respectively. The first releasably fastenable mechanism mounts said top end to a vehicle luggage compartment and said second releasably fastenable mechanism mounts said lower end to a vehicle.

The first releasably fastenable mechanism comprises at least one threaded aperture or may comprise at least one suction cup. The second releasably fastenable mechanism comprises at least one suction cup or other easily, and releasably mountable support. When the bracket includes multiple supports, said supports are oriented parallel to the other. When at least one horizontal beam is employed said beam may be disposed at the top end of the support. The beam and the support may be static, or adjustable, telescopically.

The adjustable vehicle luggage compartment attachment system comprises a vehicle luggage compartment and a bracket. The bracket has at least one support having a top end, a lower end and a support length disposed between said top end and said lower end. A first and a second releasably fastenable mechanism are disposed at each said top end and said lower end, respectively. The first releasably fastenable mechanism mounts said top end to a vehicle luggage compartment and said second releasably fastenable mechanism mounts said lower end to a vehicle. The bracket may be adjustable in certain embodiments.

DETAILED DESCRIPTION OF THE INVENTION

Figure 1:
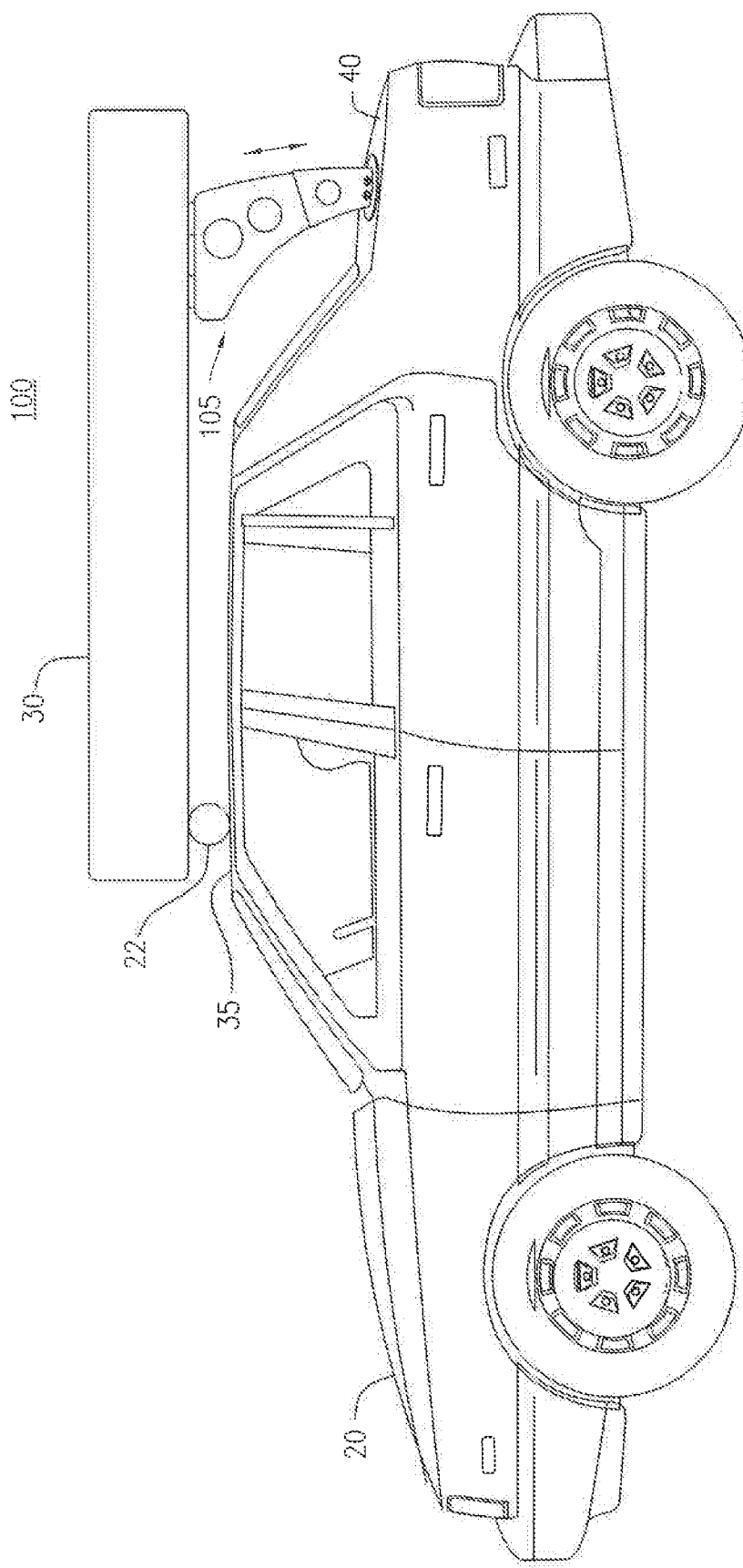
FIG. 1 illustrates a side view of an adjustable vehicle luggage compartment attachment system according to an embodiment of the invention showing a luggage rack attached to a vehicle.

FIG. 1 illustrates a side view of an adjustable vehicle luggage compartment attachment system 100 according to an embodiment of the invention. Vehicle 20 is shown with a luggage rack 30 attached to both the roof 35 of the vehicle 20 and a rear portion 40 of the vehicle 20. In one embodiment, luggage rack or compartment 30 is shown as attached via suction cups 22 on the front of the luggage compartment 30 to the roof of vehicle 20. Rear bracket 105 of the adjustable vehicle luggage compartment attachment system 100 then attaches to the rear of luggage compartment 30 at the rear window or trunk of vehicle 20.

Figure 2:
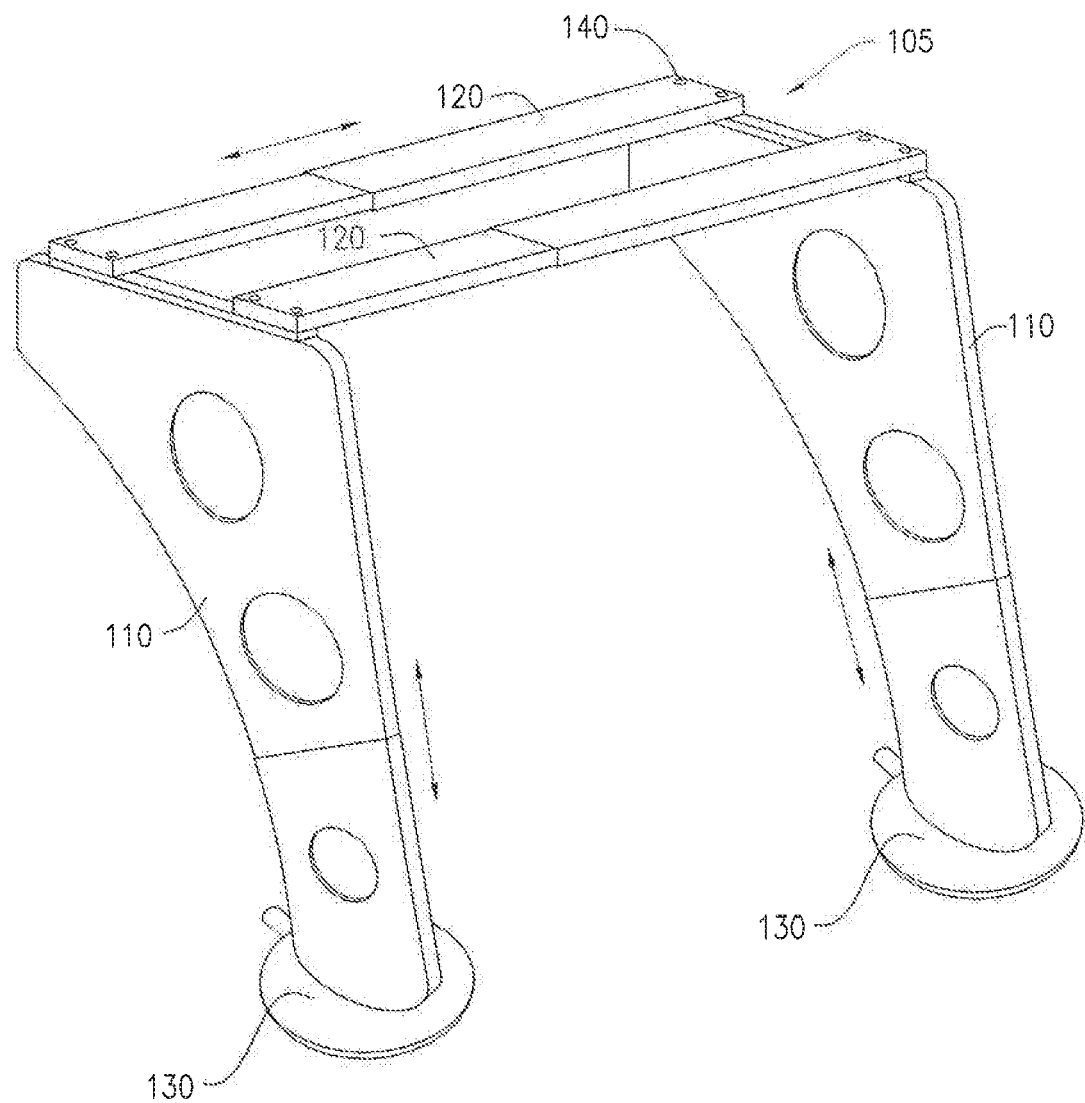
FIG. 2 illustrates a perspective view of the adjustable vehicle luggage compartment attachment system of FIG. 1, showing a rear bracket with suction attachments.
Figure 3:
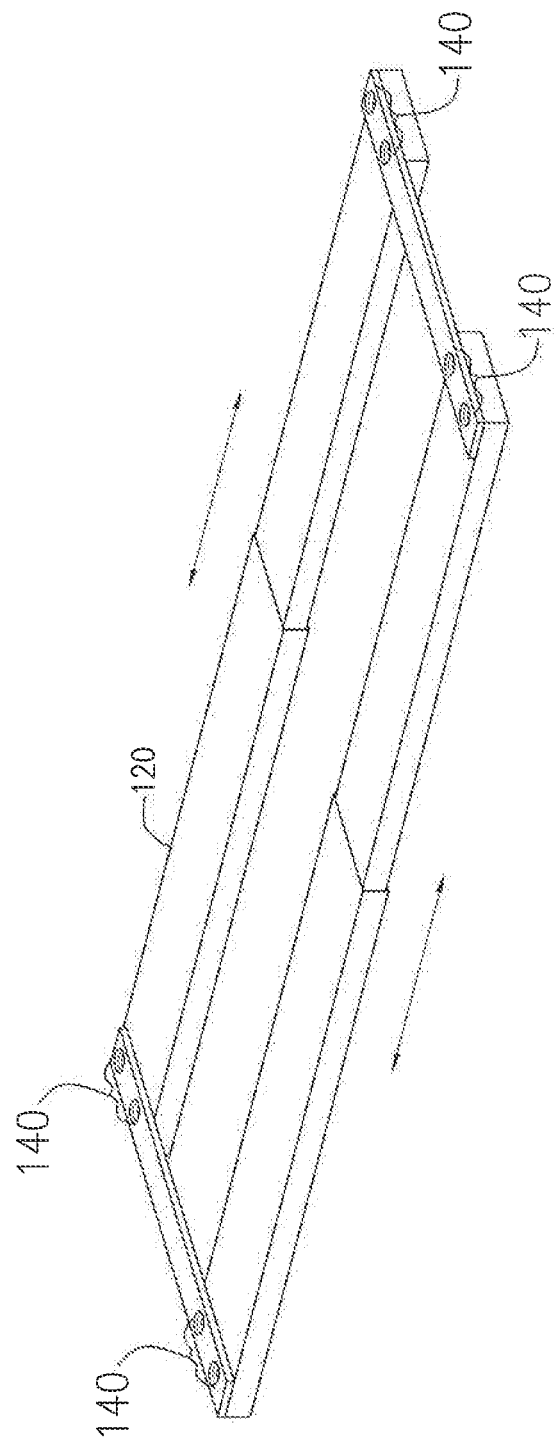
FIG. 3 illustrates a top view of the rear bracket of FIG. 2, showing the attachment points for adjustable fasteners of the attachment system adjustable vehicle luggage compartment attachment system to a luggage compartment.

FIG. 2 shows rear bracket 105 which may be solid and adjustable. In one embodiment, rear bracket 105 is formed of two parallel side supports 110 connected by two horizontal beams 120. As shown in FIG. 2, side support 110 are able to expand vertically or telescopically to adjust the height of rear bracket 105. Similarly, horizontal beams 120 may expand horizontally or telescopically. See FIG. 3. For instance, horizontal beam 120 may constructed as a two-piece or other multi-piece nested beam to adjust the width of rear bracket 105.

When the bracket 105 is height adjustable, height modifications can be made by adjusting the overall height of rear bracket 105 to assist in leveling luggage compartment 30 on top of vehicle 20. For instance, when constructed as a multi-piece nested structure, each side support 110 can adjust the height of rear bracket 105 with a locking mechanism (not shown) to set the height. It can be appreciated that rear bracket 105 can be height adjustable by other means as is known in the art. Height adjustment of rear bracket 105 is accomplished by adjustable mounts to luggage compartment 30 and placement on the rear window for leveling the luggage compartment 30.

In another embodiment the rear bracket 105 may be solid and static and may have no width or height adjustments. In yet another embodiment, one support 110 may be used with or without horizontal beam(s) with an attachment mechanism at the top and lower ends of the support 110. In any embodiment, the supports 110 bear the weight of the luggage compartment 30. For instance, rear bracket 105 can be constructed from aluminum, steel, or other desirable material depending on expected weight and implementation constraints. The advantages of the rear bracket 105 being able to be attached to the trunk, or rear portion 40 of the vehicle 20 allows for an overhanging luggage compartment 30 to be installed on a vehicle 20 without enough roof area to attach luggage compartment 30 otherwise.

At a top end of the bracket 105 are attachment points 140 for adjustable fasteners to releasably connect the rear bracket 105 to the luggage compartment 30. In one embodiment, the attachment points 140 may be threaded opening to receive screws or wing nuts however other attachment mechanisms may equally be employed to removably and releasably secure the luggage compartment 30 to the top end of the rear bracket 105. For instance, suction cups may be used at the top end. The attachment points 140 at the top end of the bracket 105 may be disposed on the horizontal beam 120 or directly on the support 110 or both.

At a lower end of the bracket 105 an attachment mechanism such as suction cups 130 or other removable, releasable mechanism may be used to a vehicle body panel or vehicle window. The attachment mechanism employed at the lower end of the bracket 105 will not damage or disrupt the integrity of the vehicle surface or window and may be a soft attachment mechanism. When attachment mechanism such as suction cup 130 is used, a stable mounting platform is provided to attach to the rear of the vehicle.

In another non-limiting embodiment, an adjustable width bracket may be employed to allow for attachment to different luggage compartments 30 or other such desirable roof rack implements (i.e. ski rack, bike rack, or the like). It can be appreciated that rear bracket can have other implementations of width adjustment as is known in the art. It can be appreciated that depending on the type of vehicle and type of roof rack used, leveling can be accomplished by use of a width and height adjustable rear bracket 105 as described above.

Figure 4:
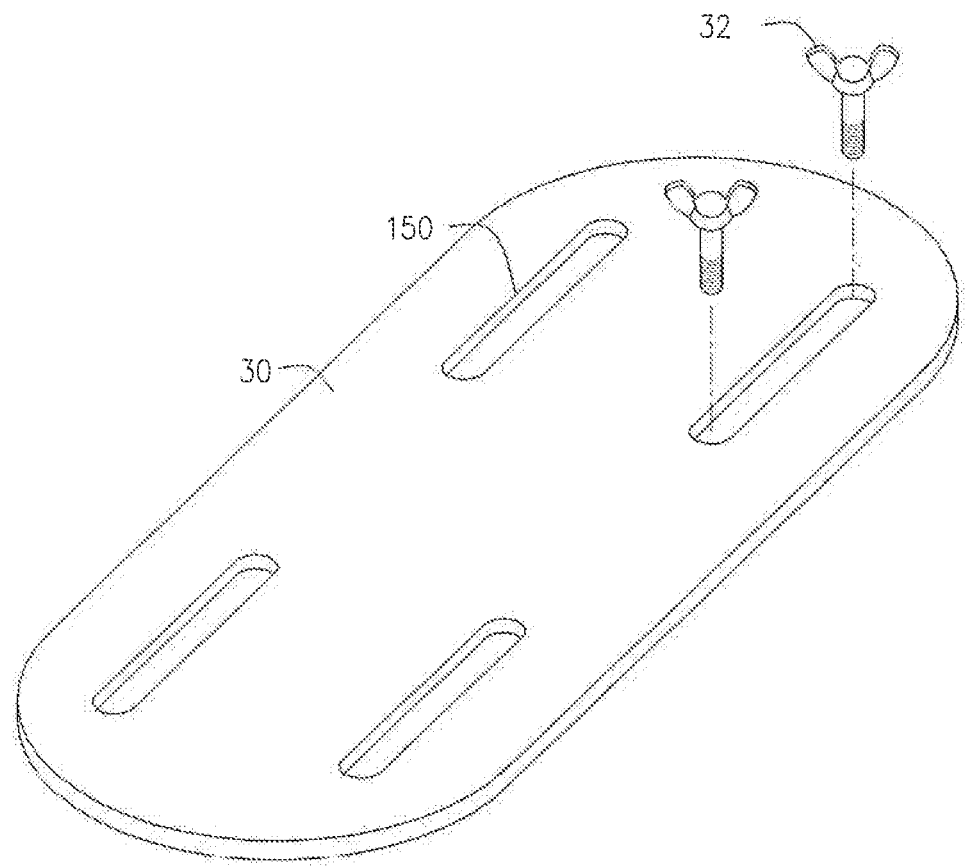
FIG. 4 illustrates a bottom view of a luggage rack showing attachment point locations.

FIG. 4 illustrates a view of the inside-bottom wall or surface of a luggage rack 30 showing apertures 150. In one example, the attachment points 140 in the rear rack 105 align with one or more apertures 150 of the luggage rack 30 and once aligned corresponding mating portion such as screws or wing nuts 32 secure the bottom wall of luggage rack 30 to the rear bracket 105. Attachment points 140 may be threaded to receive screws or other threaded securing mean. However, attachment points 140 may be any sort of securing mechanism and would receive a corresponding mating portion to wedge the luggage rack 30 between the top end of the bracket 105 and the corresponding mating portion.

FIG. 4 shows apertures 150 at front and rear ends of the bottom wall, however location of the apertures are not limited. In another embodiment, the apertures may receive tracks to provide adjustment of the location of how the luggage rack 30 can properly be positioned along the roof of a vehicle 40. In another exemplary embodiment, one or more of the forward and rear apertures 150 are not adjustable.

While specific embodiments of the invention have been described and illustrated, such embodiments should be considered illustrative of the invention only and not as limiting the invention as construed in accordance with the accompanying claims. One of ordinary skill in the art could alter the above embodiments or provide insubstantial changes that may be made without departing from the scope of the invention.

I claim:

1. An adjustable vehicle luggage compartment attachment system comprising:
   a bracket having at least one support, said support having a top end, a lower end and a support length disposed between said top end and said lower end, the support length is telescopically adjustable;
   a first releasably fastenable mechanism disposed at said top end;
   a second releasably fastenable mechanism disposed at said lower end;
   wherein said first releasably fastenable mechanism mounts said top end to a vehicle luggage compartment and said second releasably fastenable mechanism mounts said lower end to a vehicle.

2. The system of claim 1, wherein said first releasably fastenable mechanism comprises at least one threaded aperture.

3. The system of claim 1, wherein said first releasably fastenable mechanism comprises at least one suction cup.

4. The system of claim 1, wherein said second releasably fastenable mechanism comprises at least one suction cup.

5. The system of claim 1, further comprising a second support.

6. The system of claim 5, wherein said two supports are oriented parallel to the other.

7. The system of claim 6, further comprising at least one horizontal beam.

8. The system of claim 7, wherein the horizontal beam is telescopically adjustable.

9. An adjustable vehicle luggage compartment attachment system comprising:
   a bracket having a first support and a second support, said first support positioned parallel to said second support, each said support having a top end, a lower end and a support length disposed between said top end and said lower end, wherein the bracket support length is vertically adjustable;
   a first releasably fastenable mechanism disposed at said top ends;
   at least one horizontal beam disposed at said top ends of each said first support and said second support;
   a second releasably fastenable mechanism disposed at said lower ends;
   wherein said first releasably fastenable mechanism mounts said top end to a vehicle luggage compartment and said second releasably fastenable mechanism mounts said lower end to a vehicle.

10. The system of claim 9, wherein said first releasably fastenable mechanism comprises at least one threaded aperture.

11. The system of claim 9, wherein said first releasably fastenable mechanism comprises at least one suction cup.

12. The system of claim 9, wherein said second releasably fastenable mechanism comprises at least one suction cup.

13. The system of claim 9, wherein the horizontal beam is horizontally adjustable.

14. An adjustable vehicle luggage compartment attachment system comprising:
   A vehicle luggage compartment; and
   a bracket, said bracket being at least one support having a top end, a lower end and a support length disposed between said top end and said lower end, said braCket begin vertically expandable;
   a first releasably fastenable mechanism disposed at said top end;
   a second releasably fastenable mechanism disposed at said lower end;
   wherein said first releasably fastenable mechanism mounts said top end to the vehicle luggage compartment and said second releasably fastenable mechanism mounts said lower end to a vehicle.

15. The system of claim 14, wherein said first releasably fastenable mechanism comprises at least one threaded aperture.

16. The system of claim 14, wherein said first releasably fastenable mechanism comprises at least one suction cup.

17. The system of claim 14, wherein said second releasably fastenable mechanism comprises at least one suction cup.

* * * * *